United States Patent
Schmitz

(10) Patent No.: US 8,596,020 B2
(45) Date of Patent: Dec. 3, 2013

(54) TRIM PART

(75) Inventor: Stefan Schmitz, Stuttgart (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/606,786

(22) Filed: Sep. 7, 2012

(65) Prior Publication Data

US 2013/0239510 A1    Sep. 19, 2013

(30) Foreign Application Priority Data

Sep. 9, 2011 (DE) .......................... 10 2011 053 454

(51) Int. Cl.
*E04C 2/38* (2006.01)
(52) U.S. Cl.
USPC .......................................... 52/716.5; 52/716.6
(58) Field of Classification Search
USPC .................................. 52/716.5, 716.6, 717.01
See application file for complete search history.

(56) References Cited

U.S. PATENT DOCUMENTS 6,096,402 A * 8/2000 Tamura .......................... 428/114
7,040,682 B2 * 5/2006 Tokumoto et al. ........... 296/1.08

FOREIGN PATENT DOCUMENTS

| DE | 3309757 A1 | 9/1984 |
| DE | 102005057991 A1 | 6/2007 |
| EP | 1072383 A1 | 1/2001 |
| GB | 2136367 A | 9/1984 |

OTHER PUBLICATIONS

German Patent Office, Search Report in German Patent Application No. 10 2011 053 454 (Aug. 23, 2012).

* cited by examiner

*Primary Examiner* — Basil Katcheves
(74) *Attorney, Agent, or Firm* — Leydig, Voit & Mayer, Ltd.

(57) ABSTRACT

A trim part for a body part includes an angled region having diverging limbs that enclose a first angle. A cut-out is disposed in the angled region. A closure part is configured to at least partially close the cut-out and includes diverging limbs that enclose a second angle. At least one of the diverging limbs of the closure part lies in congruence with a respective limb of the angled region so as to form a flush visible side. The first angle of the angled region is greater than the second angle of the closure part and the second limb of the angled region does not lie in congruence with the second limb of the closure part so as to provide a clearance with a third angle.

6 Claims, 3 Drawing Sheets

TRIM PART

CROSS REFERENCE TO RELATED APPLICATIONS

This application claims priority to German Patent Application No, DE 10 2011 053 454.7, filed Sep. 9, 2011, which is hereby incorporated by reference herein in its entirety.

FIELD

The invention relates to a trim part for a body part.

BACKGROUND

In series vehicle production trim parts may be fastened to body parts and trim the latter towards the vehicle interior. It is customary here that functional parts, which are fastened to the body parts, are also covered by the trim parts, with the result that occupants cannot see the functional parts. For any repairs or special settings of the functional parts, it is then necessary to remove the trim part, that is to say to dismantle it from the body part.

In order to reduce the work for this purpose, it has been disclosed to secure individual parts, such as exit lights, such that they can be dismantled, in order for tools to reach the functional parts which are arranged behind them. Nevertheless, the dismantling work continues to exist.

SUMMARY

In an embodiment, the present invention provides a trim part for a body part including an angled region having diverging limbs that enclose a first angle. A cut-out is disposed in the angled region. A closure part is configured to at least partially close the cut-out and includes diverging limbs that enclose a second angle. At least one of the diverging limbs of the closure part lies in congruence with a respective limb of the angled region so as to form a flush visible side. The first angle of the angled region is greater than the second angle of the closure part and the second limb of the angled region does not lie in congruence with the second limb of the closure part so as to provide a clearance with a third angle.

BRIEF DESCRIPTION OF THE DRAWINGS

Exemplary embodiments of the present invention are described in more detail below with reference to the drawings, in which.

DETAILED DESCRIPTION

In an embodiment, an aspect of the present invention is to provide access to functional parts which are arranged behind a trim part, without the dismantling of the trim part or parts thereof.

In an embodiment, the present invention allows for configuring a closure part in such a way and inserting it into the trim part such that, as it were, an invisible, more or less concealed entry is produced to the functional part which is arranged behind the trim part. This is achieved by the closure part being arranged in a cut-out of an angled region of the trim part. The angled region is defined by two diverging limbs which enclose an angle $\alpha$. The closure part is likewise provided in an angled manner with two limbs which enclose an angle $\beta$. If, as provided according to the invention, the limb of the angled region and the limb of the closure part then come to lie in congruence with respect to one another, as viewed in cross section, this results in a flush side which preferably lies in the viewing direction of the occupant and is therefore called a flush visible side in the following text. The two visible-side limbs extend in the same plane at least as far as the point of the angle. On account of the different angular positions $\alpha$ und $\beta$, the two other limbs extend in respectively different planes. As a result of the fact that the angle $\beta$ of the closure part is smaller than the angle $\alpha$ of the angled region of the trim part, a segment with a differential angle $\phi$ is formed on that side of the panel which cannot be seen by an occupant. Via this segment, a tool can then be introduced behind the panel in this region at least, in order to reach the functional part which lies behind it. The invention can provide, as it were, in covering, that is to say closing, only a region of a cut-out in a panel by way of the closure part, which region can be seen by the occupant. In a region of the cut-out, which cannot be seen by the occupant, a part region of the said cut-out remains free, which part region can be used for the access by a tool. The geometry of this free part region is based on the position of the functional part or its setting device.

The closure part can be, for example, an exit light which is integrated into a door panel. The functional part which is arranged behind the door panel can then be a window lifter rail. However, the invention is not restricted to this preferred refinement.

Figure 1:
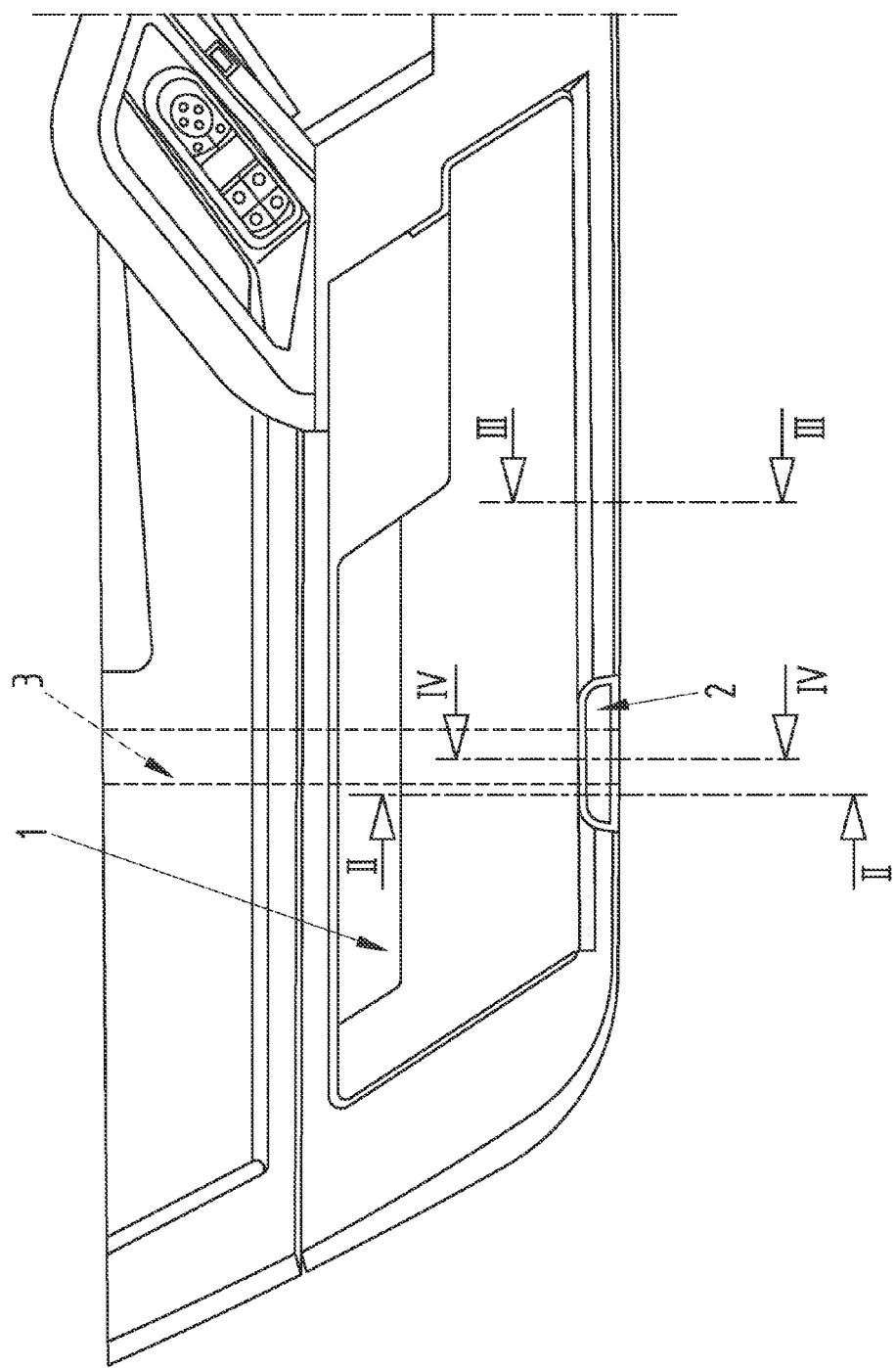
FIG. 1 shows a side view of a motor-vehicle door from the vehicle interior.

Although aspects of the invention can be applied to a very wide variety of trim parts and closure parts, the exemplary embodiment according to FIGS. 1 to 5 relates for illustration purposes to a door panel with an integrated exit light. Here, the door panel 1 represents the trim part according to the invention, the exit light 2 represents the closure part and the window lifter rail 3 represents the functional part. Accordingly, the door panel 1 which is shown in FIG. 1 covers the substantially vertically extending window lifter rail 3.

Figure 3:
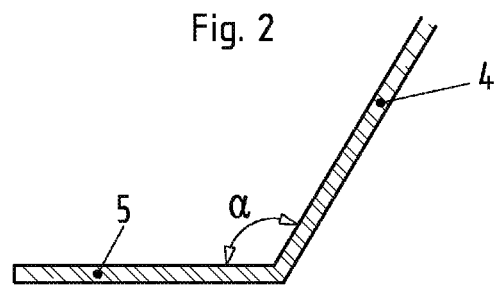
FIG. 3 shows a sectional illustration according to the line III-III in FIG. 1.
Figure 4:
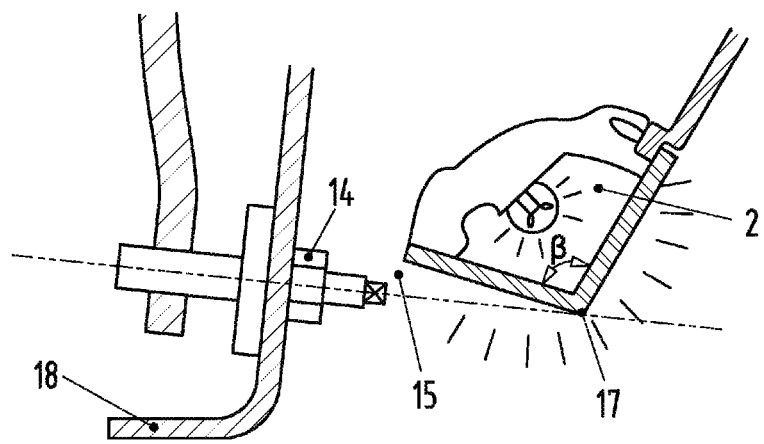
FIG. 4 shows a sectional illustration according to the line IV-IV in FIG. 1.
Figure 5:
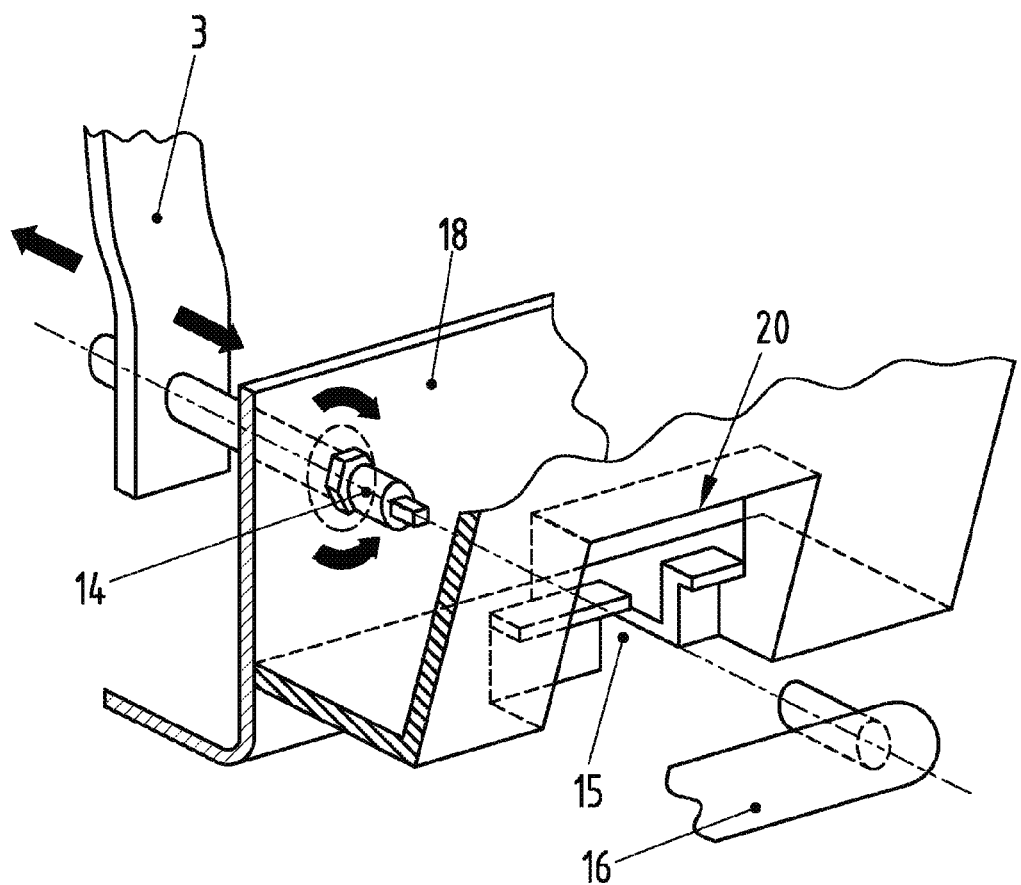
FIG. 5 shows a perspective view of the cut-out in FIG. 1 without an inserted exit light.

According to FIG. 3, in the region of the lower door edge, that is to say next to or outside the exit light 2, the door panel 1 is characterized by two limbs 4 and 5 which diverge in cross section at the angle $\alpha$, the limb 5 extending substantially horizontally, that is to say in the y-direction in the vehicle coordinate system.

Figure 2:
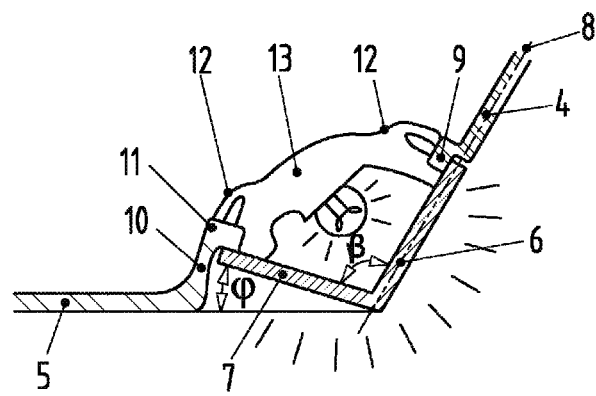
FIG. 2 shows a sectional illustration according to the line II-II in FIG. 1.

According to FIG. 2, in cross section, the translucent segment of the exit light 2 has two limbs 6 and 7 which diverge at the angle $\beta$. Furthermore, the angle $\alpha$ between the limbs 4 and 5 at the lower edge of the door panel 1 is greater than the angle $\beta$ between the limbs 6 and 7 in the cross section of the translucent segment of the exit light 2.

In the region of the exit light 2, the lower edge of the door panel 1 is provided with a cut-out 20 for the exit light 2, with the result that the limbs 4 and 5 of the door panel 1 are either connected to one another there such that they are shortened in cross section or are no longer connected to one another at all. Moreover, the limb 6 lies in the cross section of the translucent segment of the exit light 2 on an imaginary extension line of the limb 4 in the cross section of the door panel 1, which is shown as a dotted line 8 in FIG. 2. A merely small spacing between the course of the limb 4 of the door panel 1 and of the limb 6 of the exit light 2 is also conceivable. Finally, as viewed in cross section, the two limbs 4 and 6 lie in congruence with respect to one another, which results, in the plan view of the door panel 1, in a flush state of the translucent segment of the exit light 2 with those surfaces of the door panel 1 which surround the exit light 2. The better the surfaces are oriented flushly with respect to one another, the more advantageous the light quality because deviations from this flush state cause disruptive shadows on the adjacent surfaces of the door panel 1 at the perimeter of the exit light 2. In the contact region with the exit light 2, the limb 4 is provided, moreover, in cross section with a convex/concave eccentricity 9. As a consequence of the difference between the angle α and the angle β, a flange 10 which is put down substantially vertically with respect to the limb 5 is provided at the end of the shortened and horizontally extending limb 5 so as to lie opposite the differential angle φ where α−β=φ, the contact region of which flange 10 with the exit light 2 is distinguished in cross section by a bent-away portion 11. The limbs 6 and 7 of the translucent segment lie on the angled-away portion 11 and on the convex/concave eccentricity 9, positively locking and resilient fastening sections 12 on the exit-light housing 13 being supported on the rear side of the angled-away portion 11 and on the rear side of the convex/concave eccentricity 9 and, as a result, securing the exit light 2 in its position in the door panel 1. This geometric arrangement defines the opening at the lower edge of the door panel 1 for receiving the exit light 2.

As has already been mentioned, the lower end of an adjustable window lifter rail 3 is situated behind the exit light 2. In order to provide access to the adjusting element 14 of the window lifter rail 3. limb 5 including flange 10 are removed in the cross section of the door panel 1 locally and outside the active surfaces of the door panel 1 for the fastening sections 12 which are attached resiliently to the exit-light housing 13, which results spatially in a clearance 15 below the exit light 2. The adjusting element 14 can be reached via this clearance 15, for example by way of a tool 16. Accordingly, the accessibility of the adjusting element 14 via the clearance 15 can be effected without dismantling the door panel 1 from the door 18 and without dismantling the exit light 2 from the door panel 1.

This arrangement is advantageous because the setting of the window lifter rail 3 does not take place until shortly before the finishing of the vehicle assembly and when the doors are already mounted on the vehicle body, in particular in the case of frameless doors, in order to produce the flush state, indispensable for a high exterior quality, of the door pane and the adjacent fixed glazing of the vehicle side wall. As a result of the concept of the invention, complicated and risky dismantling of the door panel 1 which was previously installed during the interior or door mounting from the door which is already situated in the vehicle, in order to set the window lifter rail 3, is dispensed with. Likewise superfluous is the logistically and qualitatively disadvantageous compromise solution of mounting the door panel 1 to the door 18 during the vehicle production only after the station which is responsible for setting the window lifter rail 3, and therefore of relocating it to an assembly location not originally provided for completing interior tasks. Moreover, in view of the wide variety of variants of door panels, this compromise solution requires a dedicated interim door-trim storage facility for this assembly location and is also disadvantageous on account of this logistical space requirement. The concept of the invention accordingly has a favourable effect on the internal production logistics because the door can already be fitted with the door panel 1 before installation into the vehicle body and there is nevertheless the option of setting the window lifter 3 at a later production instant. As a result of the fact that, in the installed state, the lowest point 17, that is to say the top point of the exit light 2, lies on or below the as far as possible horizontal longitudinal axis of the adjusting element 14, the adjusting element 14 is placed discreetly, despite the good accessibility for tools, and cannot be identified by the occupant when viewing the door panel 1 from above.

While the invention has been particularly shown and described with reference to preferred embodiments thereof, it will be understood by those skilled in the art that various changes in form and details may be made therein without departing from the spirit and scope of the invention.

What is claimed is:

1. A trim part for a body part, the trim part comprising:
   an angled region including diverging limbs that enclose a first angle;
   a cut-out disposed in the angled region; and
   a closure part at least partially closing the cut-out, the closure part including diverging limbs that enclose a second angle, at least one of the diverging limbs of the closure part lying in congruence with a respective limb of the angled region so as to form a flush visible side, the first angle of the angled region being greater than the second angle of the closure part, and the second limb of the angled region not lying in congruence with the second limb of the closure part so as to provide a clearance with a third angle.

2. The trim part as recited in claim 1, wherein the trim part is a door panel.

3. The trim part as recited in claim 1, wherein the closure part is an exit light.

4. The trim part as recited in claim 2, wherein a window lifter rail is disposed between the door panel and the body part, the window lifter rail having an adjusting element that is accessible through the clearance.

5. The trim part as recited in claim 1, wherein a flange is put down vertically with respect to a horizontally extending limb of the angled region.

6. The trim part as recited in claim 3, where, in an inserted state, the exit light has a lowest point that lies on or above a longitudinal axis of the adjusting element.

* * * * *